(12) United States Patent
Ishikawa et al.

(10) Patent No.: US 7,409,273 B2
(45) Date of Patent: Aug. 5, 2008

(54) TIRE TROUBLE DETECTION DEVICE

(75) Inventors: Tomoyuki Ishikawa, Nissin (JP);
Hideki Murakami, Toyota (JP); Yuji Taki, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 849 days.

(21) Appl. No.: 10/861,522

(22) Filed: Jun. 7, 2004

(65) Prior Publication Data

US 2004/0267416 A1 Dec. 30, 2004

(30) Foreign Application Priority Data

Jun. 18, 2003 (JP) ............................. 2003-173292
Apr. 6, 2004 (JP) ............................. 2004-111871

(51) Int. Cl.
*G01M 17/00* (2006.01)

(52) U.S. Cl. .......................................... 701/29; 701/31

(58) Field of Classification Search ..................... 701/1, 701/29, 30, 31, 35, 36; 73/146.2–146.8; 340/442, 445, 448
See application file for complete search history.

(56) References Cited

U.S. PATENT DOCUMENTS 6,763,288 B2 * 7/2004 Caretta et al. ................. 701/1
7,119,896 B2 * 10/2006 Godeau et al. ............ 356/237.2
7,150,187 B2 * 12/2006 Caretta ........................ 73/146
2005/0150283 A1 7/2005 Shick et al.

FOREIGN PATENT DOCUMENTS

| DE | 24 56 215 A1 | 6/1975 |
|---|---|---|
| DE | 35 44 894 C1 | 6/1987 |
| DE | 199 24 830 A1 | 11/2000 |
| DE | 102 53 367 A1 | 6/2004 |
| JP | A 7-81337 | 3/1995 |
| JP | A 7-81341 | 3/1995 |
| JP | A 9-193627 | 7/1997 |
| WO | 01/80327 | * 10/2001 |
| WO | WO 03/091046 A1 | 11/2003 |

* cited by examiner

*Primary Examiner*—Richard M. Camby
(74) *Attorney, Agent, or Firm*—Oliff & Berridge, PLC

(57) ABSTRACT

A tire trouble detection device detects occurrence of a trouble in a tire. The tire trouble detection device comprises a detection unit which detects a change of state of a layered composition portion arranged in layers inside an outer sheath forming an outside surface of the tire, the layered composition portion forming a frame of the tire. A determination unit receives a result of the detection from the detection unit and determines occurrence of a trouble of the layered composition portion based on the received result of the detection.

15 Claims, 15 Drawing Sheets

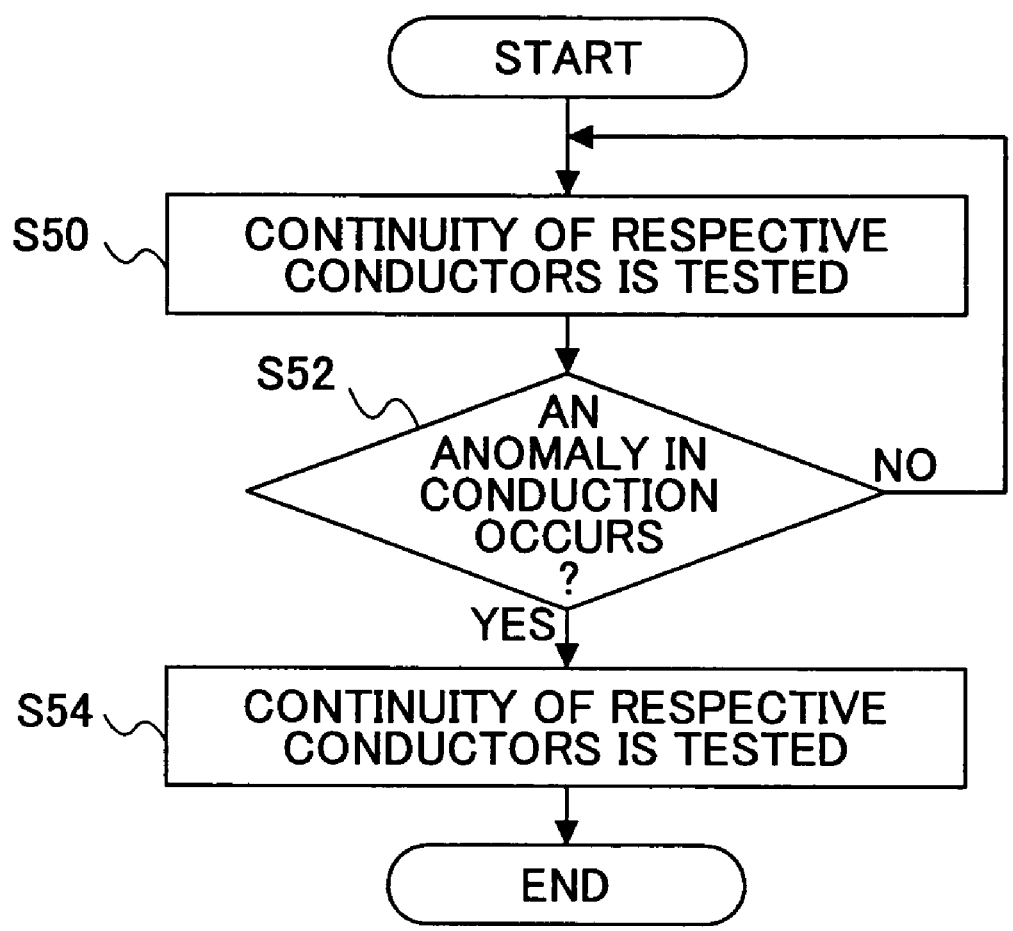

TIRE TROUBLE DETECTION DEVICE

CROSS-REFERENCE TO RELATED APPLICATION

This application is based upon and claims the benefit of priority from the prior Japanese application No. 2003-173292, filed on Jun. 18, 2003, and the prior Japanese application No. 2004-111871, filed on Apr. 6, 2004, the entire contents of which are incorporated herein by reference.

BACKGROUND OF THE INVENTION

1. Field of the Invention

The present invention relates to the tire trouble detection technology of detecting the occurrence of troubles in the tires of an automotive vehicle.

2. Description of the Related Art

In order to make the automotive vehicle run safely, it is indispensable to keep the states of the tires normal. If a trouble occurs in any of the tires, it is necessary to detect it exactly and take the suitable measures to eliminate it. Conventionally, the technology of detecting the occurrence of troubles in the tires is known.

For example, Japanese Laid-Open Patent Application No. 7-081337 discloses a tire trouble detection device in which the electrodes are arranged in the tread portion and the rim portion in the air cell of the tire, respectively, and the distortion of the tire is detected based on the static capacitance that varies according to the distance between the electrodes.

Moreover, Japanese Laid-Open Patent Application No. 7-081341 and Japanese Laid-Open Patent Application No. 9-193627 disclose the technology similar to the above-mentioned device.

According to the conventional technology disclosed in Japanese Laid-Open Patent Application No. 7-081337, it is possible to detect the occurrence of troubles, such as the drop of the air pressure of the tire or the rapid unusual deformation of the tire. However, it is difficult to detect the partial plastic deformation in the carcass, the inner liner, etc. of the tire inside.

When the tire steps on the curbstone on the road or the safety rivet (called the cat's eye) embedded in the road surface or the road center line, the layered composition portion in the tire inside, such as the carcass, may be damaged and the swelling (or bulging) of the sidewall portion of the tire may occur, although it does not result in the rapid unusual deformation.

If it results in the rapid unusual deformation, the possibility that the driver notices the trouble in the tires is high. In such a case, the conventional technology can detect the occurrence of the trouble. However, if it does not result in the rapid unusual deformation and the trouble occurs in the tire inside only, the possibility that the driver does not notice the trouble even by visual inspection remains. In such a case, the conventional technology cannot detect the occurrence of the trouble.

SUMMARY OF THE INVENTION

An object of the present invention is to provide an improved tire trouble detection device in which the above-mentioned problems are eliminated.

Another object of the present invention is to provide a tire trouble detection device which exactly detects the occurrence of troubles inside the tires of the vehicle.

Another object of the present invention is to provide a tire for use with a tire trouble detection device which exactly detects the occurrence of troubles inside the tires of the vehicle.

The above-mentioned objects of the invention are achieved by a tire trouble detection device which detects occurrence of a trouble in a tire, the tire trouble detection device comprising: a detection unit detecting a change of state of a layered composition portion which is arranged in layers inside an outer sheath forming an outside surface of the tire, the layered composition portion forming a frame of the tire, and a determination unit receiving a result of the detection from the detection unit and determining occurrence of a trouble of the layered composition portion based on the received result of the detection.

For example, in the layered composition portion of the tire, there are the inner liner which forms the air cell, and the carcass arranged outside the inner liner and constituted with the fiber covered with the rubber, the steel, etc. By detecting the change of state of the layered composition portion which constitutes the core of the tire, it is possible to exactly detect the occurrence of damage on the carcass or another trouble of the tire inside which is hard to detect from the appearance.

The detection unit may be configured to detect the amount of deformation of the sidewall portion of the tire, and the determination unit may be configured to determine the occurrence of a trouble in the layered composition portion when the amount of the deformation exceeds the predetermined value.

The detection unit may comprise the detecting elements which are provided in contact with or adjacent to the layered composition portion to detect electrically the amount of deformation of the sidewall portion.

The detecting elements may be a plurality of electrodes which are arranged in the radial direction of the tire at the sidewall portion in the air cell of the tire, and the determination unit may be configured to determine the occurrence of a trouble of the layered composition portion based on the change of the current between the plurality of electrodes. For example, two or more electrodes are arranged on the inside of the part where the sidewall portion tends to be crooked, such that the part is interposed by the electrodes. When the sidewall portion is crooked inside and the short-circuit between the electrodes occurs inside the tire, the occurrence of the trouble in the layered composition portion may be determined.

The detection unit may be configured to detect the change of continuity of the layered composition portion, and the determination unit may be configured to determine the occurrence of a trouble in the layered composition portion when the continuity of the layered composition portion changes. The change of the continuity of the layered composition portion includes the elongation, the erosion, the fracture, etc. of the layered composition portion.

The detection unit may comprise the detecting element which is provided in contact with or adjacent to the layered composition portion to detect electrically the change of continuity of the layered composition portion. The detecting element may be provided in the core of the layered composition portion. The detecting element may be the resistance element, and the determination unit may be configured to determine the occurrence of a trouble of the layered composition portion based on the change of the resistance of the resistance element. For example, the resistance element is arranged along the layered composition portion. When the resistance of the resistance element changes with the expansion/contraction or fracture of the resistance element etc., it may be determined that the layered composition portion is damaged.

The tire trouble detection device may comprise the plurality of detecting elements, and the determination unit may be configured to determine the occurrence position of the trouble of the layered composition portion based on the combination of the detecting elements which detect electrically the continuity of the detecting elements in order to detect the occurrence of the trouble. For example, when the trouble occurs in the continuity of the detecting elements, in the position of those intersections, the occurrence of the trouble in the layered composition portion may be determined. Thereby, the occurrence position of the trouble can be located easily and correctly, and the suitable warning information can be sent to the driver. The detecting elements may be arranged at the tread portion and the sidewall portion of the layered composition portion, and the determination unit may be provided to detect electrically the continuity of the detecting elements of the tread portion and the sidewall portion, and it may be determined whether the trouble occurs in the layered composition portion in which position of the tread portion and the sidewall portion.

Although the trouble in the tread portion can be located in many cases, the trouble in the sidewall portion cannot be located and the exchange is needed in many cases, and the suitable warning information can be sent to the driver by determining the occurrence position of the trouble. The detecting element may be provided with the elasticity such that the detecting element outputs an anomaly result of detection when subjected to a deformation that causes a trouble in the layered composition portion, and outputs a normality result of detection when subjected to a deformation that does not cause a trouble in the layered composition portion. Thereby, the occurrence of the trouble of the layered composition portion can be determined exactly.

The detecting element may have the wave-like configuration. It is possible to provide the moderate elasticity to the detecting element, and the larger area of the layered composition portion can be covered and the occurrence of the trouble of the layered composition portion can be detected exactly.

The tire trouble detection device may further comprise the warning unit which outputs the warning when the determination unit determines the occurrence of the trouble in the layered composition portion, and the warning unit may be configured to change the contents of the warning according to the occurrence position of the trouble determined by the determination unit. For example, it is possible that when the trouble occurs in the tread portion, the warning which urges repair to the driver is outputted, and when the trouble occurs in the sidewall portion, the warning which urges exchange to the driver is outputted. Thereby, suitable countermeasures to eliminate the trouble can be urged to the driver.

The detection unit may be configured to detect the force acting in the direction parallel to the surface of the layered composition portion, and the determination unit may be configured to determine the occurrence of the trouble in the layered composition portion when the detected force exceeds the predetermined value.

The above-mentioned objects of the invention are achieved by a tire for use with a tire trouble detection device, the tire comprising: a layered composition portion which is arranged in layers inside an outer sheath forming an outside surface of the tire, and forms a frame of the tire; and a plurality of detection units which are arranged in a lattice formation in contact with or adjacent to the layered composition portion to detect electrically a change of continuity of the layered composition portion.

The plurality of detection units may be the plurality of conductor elements, and the tire may further comprise a collection unit which collects the terminals of the plurality of conductor elements. Thereby, the continuity of the conductor elements can be detected easily, and the occurrence of the trouble and the occurrence position of the trouble in the tire can be determined accurately.

According to the tire trouble detection device of the present invention, it is possible to exactly detect the occurrence of troubles of the tire inside of the vehicle.

BRIEF DESCRIPTION OF THE DRAWINGS

Other objects, features and advantages of the present invention will be apparent from the following detailed description when read in conjunction with the accompanying drawings.

FIG. 19 is a flowchart for explaining the procedure of tire trouble determination performed by the tire trouble detection device in a fourth preferred embodiment of the invention.

DETAILED DESCRIPTION OF PREFERRED EMBODIMENTS

A description will now be provided of the preferred embodiments of the present invention with reference to the accompanying drawings.

Figure 1:
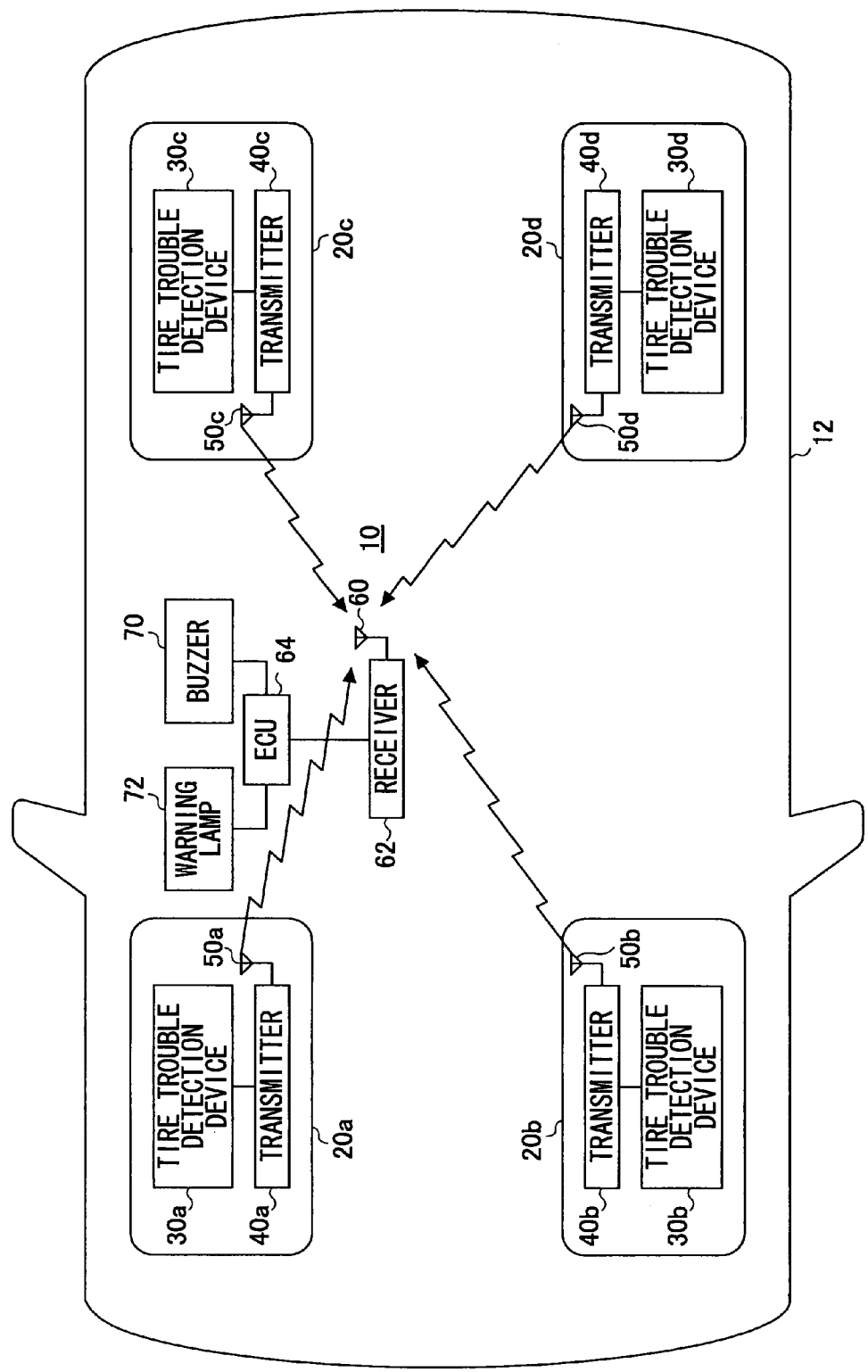
FIG. 1 is a diagram showing the composition of an automotive vehicle in which the tire trouble detection device of the invention is embodied.

FIG. 1 shows the composition of an automotive vehicle 10 in which the tire trouble detection device of the invention is embodied.

The automotive vehicle 10 is equipped with the vehicle body 12 and the four tires 20a, 20b, 20c and 20d. In the tire 20 (which represents each of the tires 20a, 20b, 20c and 20d), the tire trouble detection device 30 which determines the occurrence of a trouble in the tire 20, the transmitter 40 which transmits the result of the determination to the vehicle body 12, and the antenna 50 for transmission are provided, respectively.

In the vehicle body 12, the receiver 62 which receives the result of the determination from each tire 20, the antenna 60 for reception, the electronic control unit (ECU) 64 which controls the whole automotive vehicle 10, and the buzzer 70, and the warning lamp 72 which notifies the driver about the result of the determination are provided.

The tire trouble detection device 30 is provided with a detection unit which detects a change of state of the layered composition portion forming the frame of the tire and being arranged in layers inside the outer sheath of the tire, and a determination unit which receives the result of the detection from the detection unit and determine the occurrence of a trouble of the layered composition portion based on the received result of the detection. The tire trouble detection device 30 determines whether a trouble occurs in the tire 20, and transmits the result of the determination to the vehicle body 12 using the transmitter 40.

ECU 64 receives the result of the determination from the tire trouble detection device 30 of each tire 20. When the result of the determination indicating that the trouble occurs is received, ECU 64 outputs the warning to the driver using the buzzer 70 and the warning lamp 72.

ECU 64 may be configured to display the warning on the display section of the navigation system (not illustrated). ECU 64 may be configured to control other composition of the vehicle 10 to reduce the vehicle speed, when the result of the determination indicating that the trouble occurs is received from the tire trouble detection device 30.

ECU 64 may be configured to store, when the result of the determination indicating that the trouble occurs is received, information containing the location of the tire 20 where the trouble occurs, the date of occurrence of the trouble, the classification of the trouble, and so on. By this configuration of ECU 64, when the driver requests repair to the dealer etc., the dealer can easily grasp the contents of the trouble exactly by the diagnostic tool etc., and can take appropriate countermeasures to eliminate the trouble.

Figure 2:
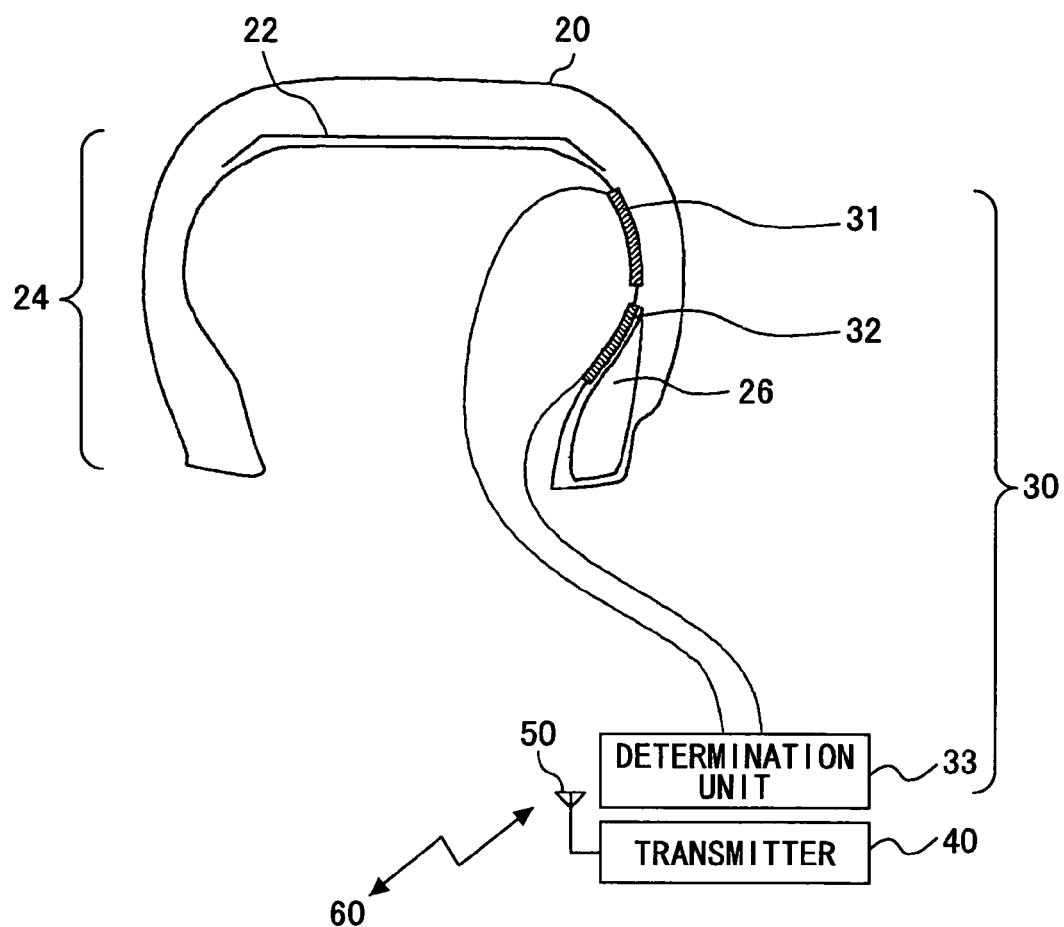
FIG. 2 is a diagram showing the cross-section of the tire in a first preferred embodiment of the invention.
Figure 3:
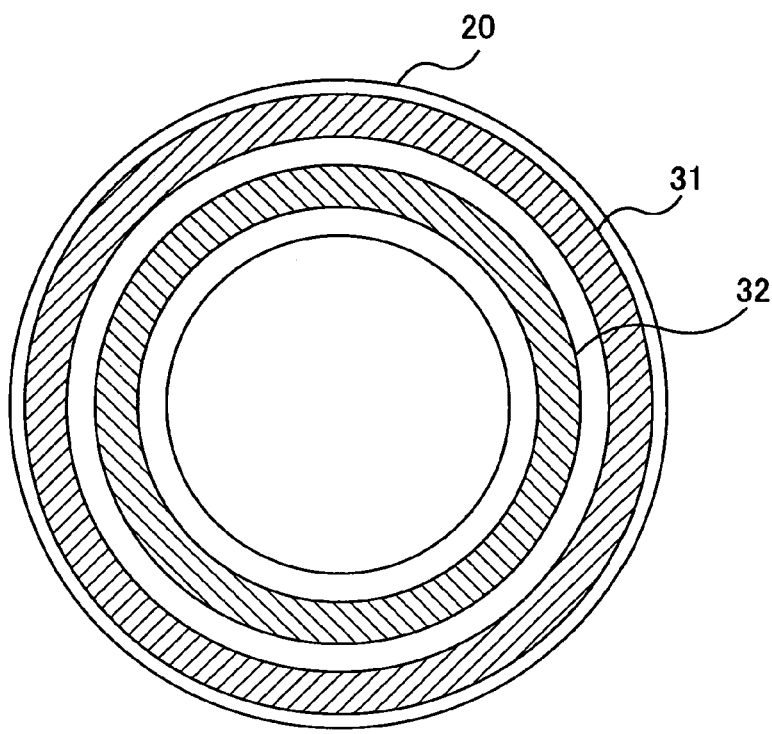
FIG. 3 is a diagram showing the side surface inside the tire of the first preferred embodiment.

FIG. 2 shows the cross-section of the tire 20 in the first preferred embodiment of the invention. FIG. 3 shows the side surface inside the tire 20 of the first preferred embodiment.

The belt-like electrodes 31 and 32 for detecting the amount of deformation of the sidewall portion 24 of the tire 20 are arranged in the formation of concentric circles along the radial direction of the tire 20 on the side surface by the side of the air cell between the steel band belt 22 and the bead filler 26 of the sidewall portion 24 of the tire 20.

The electrodes 31 and 32 are arranged up and down such that the part of the tire 20 which tends to be crooked when the tire 20 steps on the obstacle on the road is interposed between the electrodes 31 and 32. That is, it is desirable that the electrode 31 is arranged in a range from the upper-limit portion of the bead filler 26 to the edge (the butt-less part) of the steel band belt 22, and the electrode 32 is arranged in a range from the center of the bead to the upper-limit portion of the bead filler 26.

Figure 4:
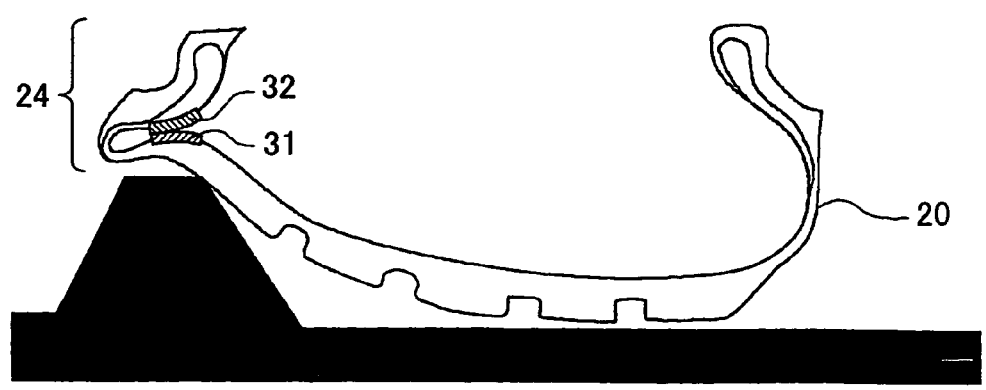
FIG. 4 is a diagram showing the condition of the tire of the first preferred embodiment when the tire steps on the obstacle on the road.

FIG. 4 shows the condition of the tire 20 when the tire 20 steps on the obstacle on the road.

In the sidewall portion 24, the tire 20 is crooked and deformed. It is confirmed by the experiments that the layered composition portion of the tire 20, such as the carcass and the inner liner, may be damaged with an excessive tensile stress generated when the inner portion of the sidewall portion 24 is bent by the external force.

Therefore, the tire trouble detection device 30 determines that a trouble occurs in the layered composition portion, when the sidewall portion 24 deforms greatly, and the tire trouble detection device 30 transmits the result of the determination to the vehicle body 12 through the transmitter 40.

As shown in FIG. 4, when the tire 20 steps on the obstacle on the road and the sidewall portion 24 is crooked, the electrodes 31 and 32 which are arranged up and down to interpose the bent-portion therebetween are brought into contact with each other. Therefore, the unusual deformation of the sidewall portion 24 can be detected by supplying current to the electrodes 31 and 32 and checking the occurrence of short-circuiting between the electrodes 31 and 32.

In this case, the specific amount of deformation of the sidewall portion 24 when the electrodes 31 and 32 are brought into contact with each other serves as a threshold value for determining the occurrence of a trouble of the layered composition portion. The electrodes 31 and 32 are arranged at the inner locations from the inner liner (i.e., at the innermost locations of the tire) so that they are in contact with each other when the sidewall portion 24 is crooked.

The determination unit 33 is always (or at a predetermined timing) passes the current from the power source (not illustrated) to the electrodes 31 and 32, and detects whether the short-circuiting occurs between the electrodes.

If the short-circuiting occurs between the electrodes, the determination unit 33 determines that a trouble occurs in the layered composition portion by the deformation of the sidewall portion 24 beyond the predetermined amount of deformation of the sidewall portion 24.

The determination unit 33 and the transmitter 40 may be formed as a chip. This chip may be provided on the inner side or outer side of the tire, and it may be provided in the core of the wheel. Alternatively, it may be provided in the tire valve, which will be described later.

As described above, according to this embodiment, the change of state of the layered composition portion inside the tire can be detected exactly, and the occurrence of a trouble in the tire can be determined.

Moreover, even when the rapid unusual deformation takes place in the sidewall portion 24, it can be detected before the pneumatic pressure change takes place and the warning indication can be outputted. Hence, it is possible that the warning indication can be outputted at an early stage of the unusual deformation of the tire.

As another variation of the present embodiment, by passing the current to the electrodes 31 and 32 at the time of a cold state, it is possible to make use of the tire trouble detection device in order to warm the tire 20.

In the above-described embodiment, the two electrodes 31 and 32 are provided. Alternatively, three or more electrodes may be provided. Moreover, in the above-described embodiment, it is detected whether short-circuiting between the electrodes occurs. Alternatively, a change of the capacitance between the electrodes may be detected. In such alternative embodiment, the deformation of the sidewall portion 24 of the tire can be detected with higher accuracy.

Next, a description will be given of the second preferred embodiment of the invention using FIG. 5 through FIG. 7.

In the second preferred embodiment, using the strain gage, the tire trouble detection device detects a force acting in a direction parallel to a surface of the layered composition portion inside the tire 20, and determines the occurrence of a trouble in the layered composition portion based on the magnitude of the detected force.

The composition of the vehicle 10 in which the tire trouble detection device of this embodiment is provided is essentially the same as that of the vehicle 10 shown in FIG. 1. A description will now be given of only the differences between the second preferred embodiment and the first preferred embodiment.

Figure 5:
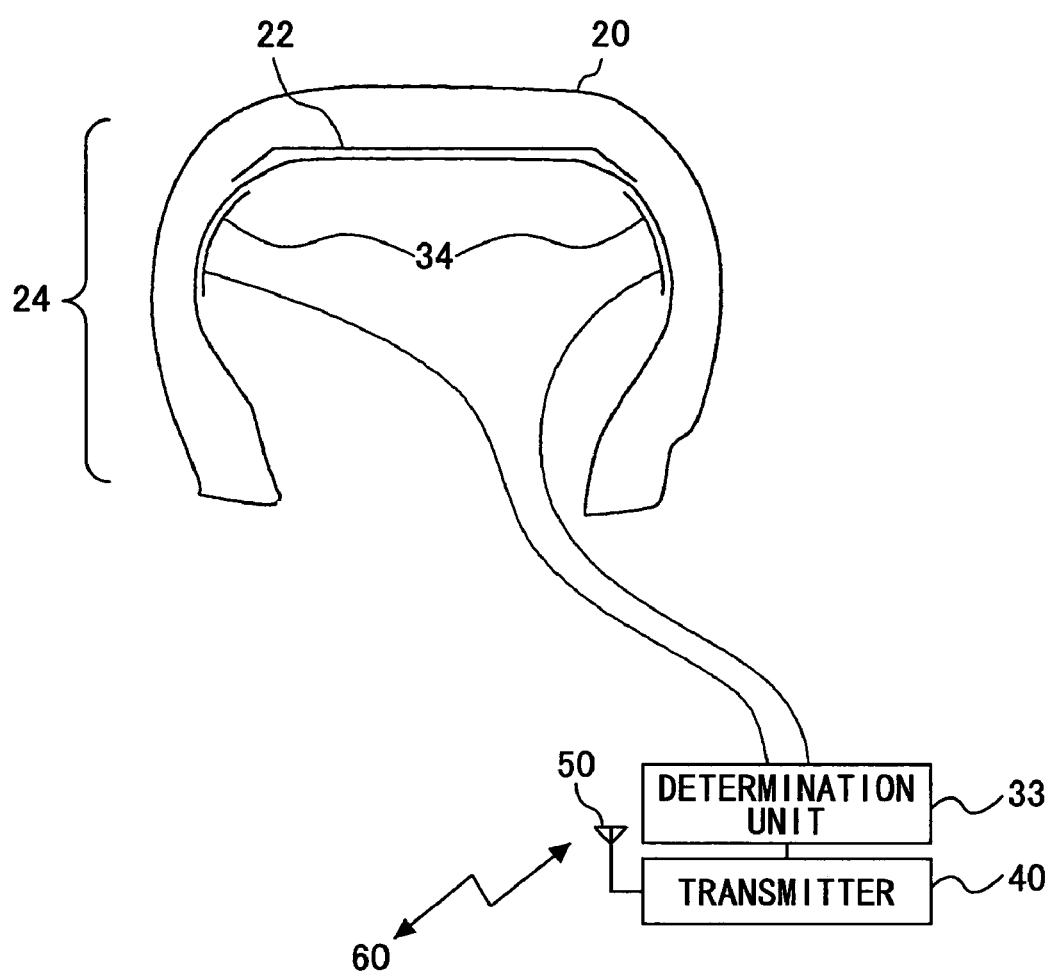
FIG. 5 is a diagram showing the cross-section of the tire in a second preferred embodiment of the invention.

FIG. 5 shows the cross section of the tire 20 of this embodiment. FIG. 6 shows the side surface inside the tire 20 of this embodiment.

When the tire 20 steps on the obstacle on the road, the strain gage 34 which detects a distortion in a radial direction of the tire 20 is provided on the side surface of the sidewall portion 24 on the side of the air cell of the tire where the sidewall portion 24 tends to be crooked. Namely, the strain gage 34 is provided on the surface of the inner liner 27.

Figure 6:
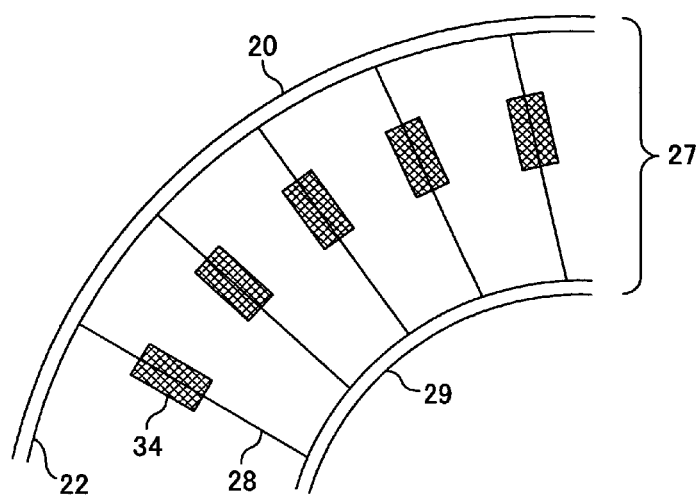
FIG. 6 is a diagram showing the side surface inside the tire of the second preferred embodiment.

As shown in FIG. 6, the strain gages 34 are respectively formed along with the arrangement of the carcass cords. The arrangement positions where the strain gages 34 are arranged may be determined according to the pattern of the arrangement of the carcass cords.

Figure 7:
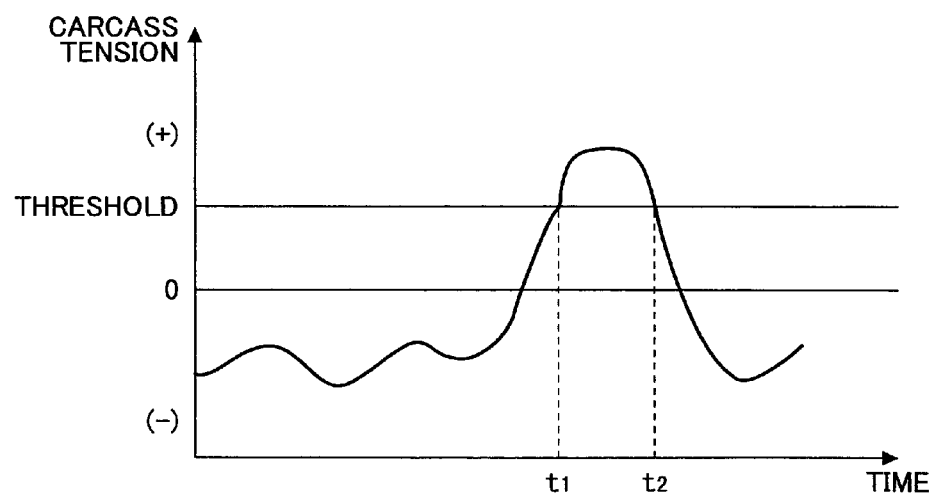
FIG. 7 is a diagram for explaining a time transition of a tensile stress output by a strain gage arranged on the carcass cord of the tire.

FIG. 7 is a diagram for explaining a time transition of the tensile stress output by the strain gage 34.

The determination unit 33 monitors the output signal of the strain gage 34, and determines the occurrence of a trouble in the layered composition portion, when the tensile stress in the carcass 28 indicated by the output signal of the strain gage 34 exceeds a predetermined threshold value.

In the example of FIG. 7, the tensile stress exceeds the threshold value during a period from time t1 to time t2, and there is the possibility that the layered composition portion may be damaged. Hence, the determination unit 33 determines that a trouble occurs in the layered composition portion. The threshold value in this case may be predetermined based on the quality of the material, the number of the plies, etc. of the carcass 28.

As described above, according to this embodiment, the change of state of the layered composition portion inside the tire can be detected exactly, and the occurrence of a trouble in the tire can be determined.

Next, a description will be given of the third preferred embodiment of the invention using FIG. 8 through FIG. 10.

In the third preferred embodiment, the resistance element is arranged in contact with or adjacent to the layered composition portion inside the tire, a change of continuity of the layered composition portion inside the tire is detected based on a change of resistance of the resistance element, and the tire trouble detection device of this embodiment determines the occurrence of a trouble in the layered composition portion based on the detected change of the continuity.

The composition of the vehicle 10 of this embodiment is the same as that of the vehicle 10 shown in FIG. 1. A description will be given of only the differences between the third preferred embodiment and the first preferred embodiment.

Figure 8:
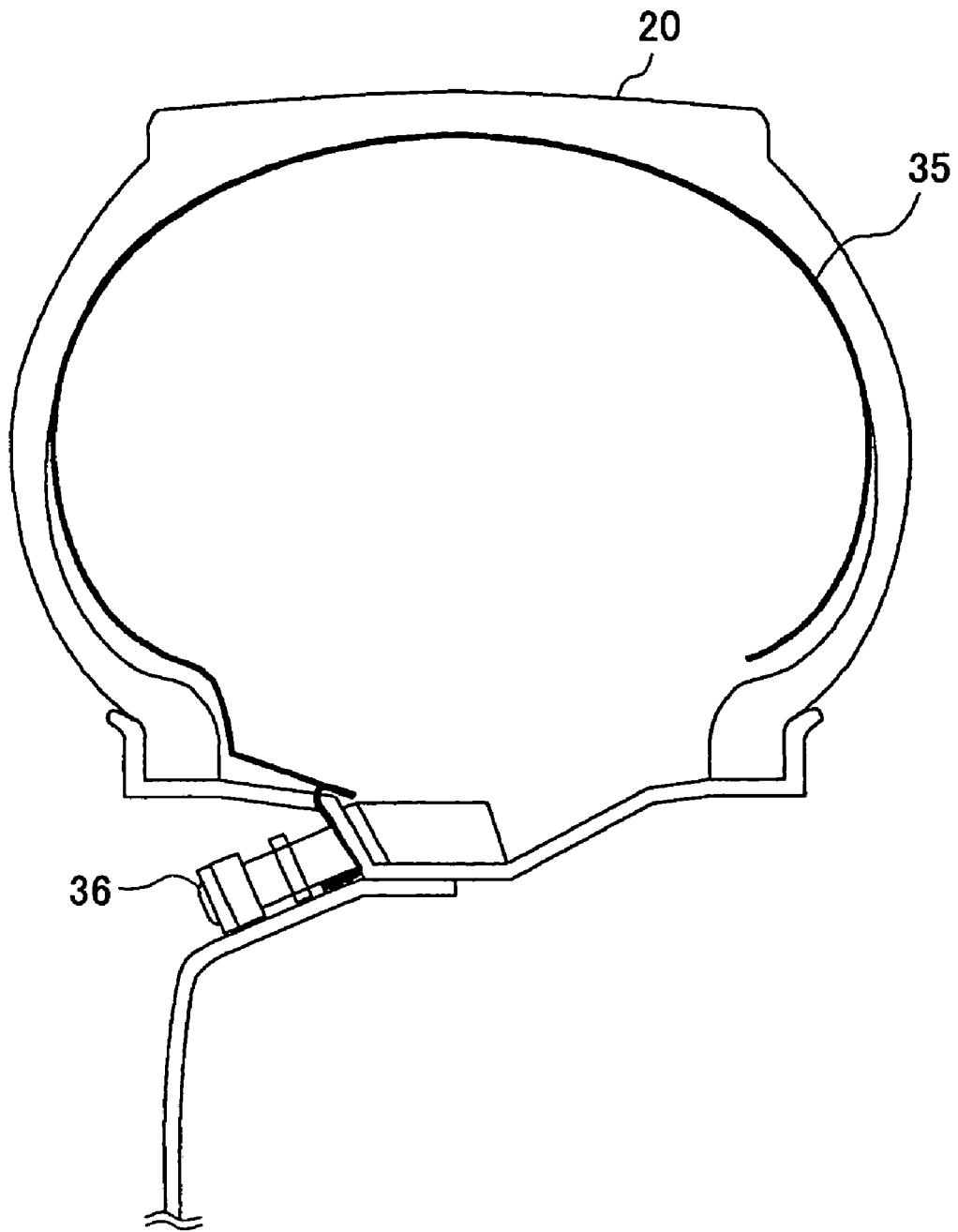
FIG. 8 is a diagram showing the cross-section of the tire in a third preferred embodiment of the invention.

FIG. 8 shows the cross section of the tire 20 of this embodiment. The sheet 35 which includes the circuit containing two or more resistance elements in the side surface of the tire 20 on the side of the air cell of the tire 20 is provided.

The sheet 35 may be attached to the air-cell side surface of the tire 20. In the production process of the tire 20, the sheet 35 may be attached to the inner liner of the tire 20. Or, the circuit of the sheet 35 may be embedded in the core of the layered composition portion, such as the inner liner and the carcass.

Figure 9:
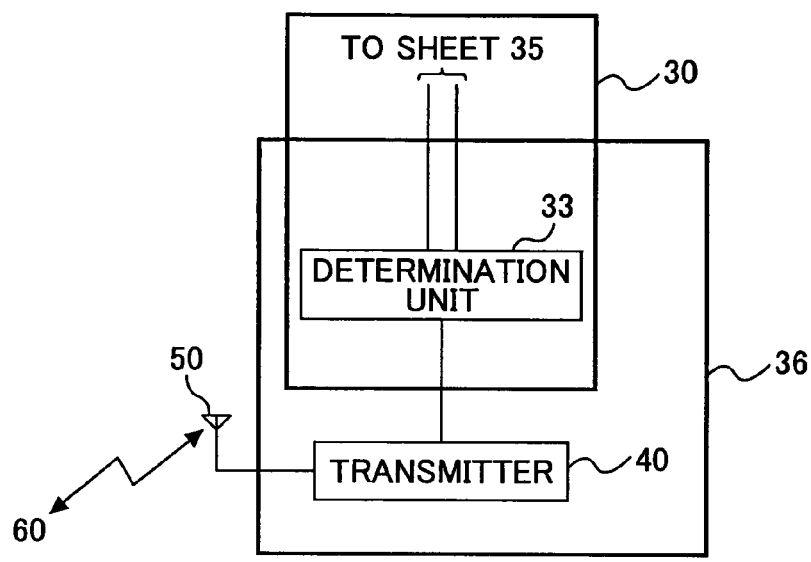
FIG. 9 is a diagram showing the composition of the tire trouble detection device provided in the tire valve of the tire of the third preferred embodiment.

FIG. 9 shows the composition of the tire trouble detection device provided in the tire valve of the tire in this embodiment.

In this embodiment, as shown in FIG. 9, the tire valve 36 is provided with the determination unit 33 and the transmitter 40. The wire connection between the circuit of the sheet 35 and the determination unit 33 is established through the valve hole, and the electrical conduction of the contact between the circuit of the sheet 35 and the determination unit 33 is secured by tightening the tire valve 36 onto the wheel.

In addition, in the vehicle 10 provided with the tire trouble detection device 30 in the first preferred embodiment or the second preferred embodiment, the determination unit 33 and the transmitter 40 may be provided in the tire valve 36, similar to the embodiment of FIG. 9.

Figure 10:
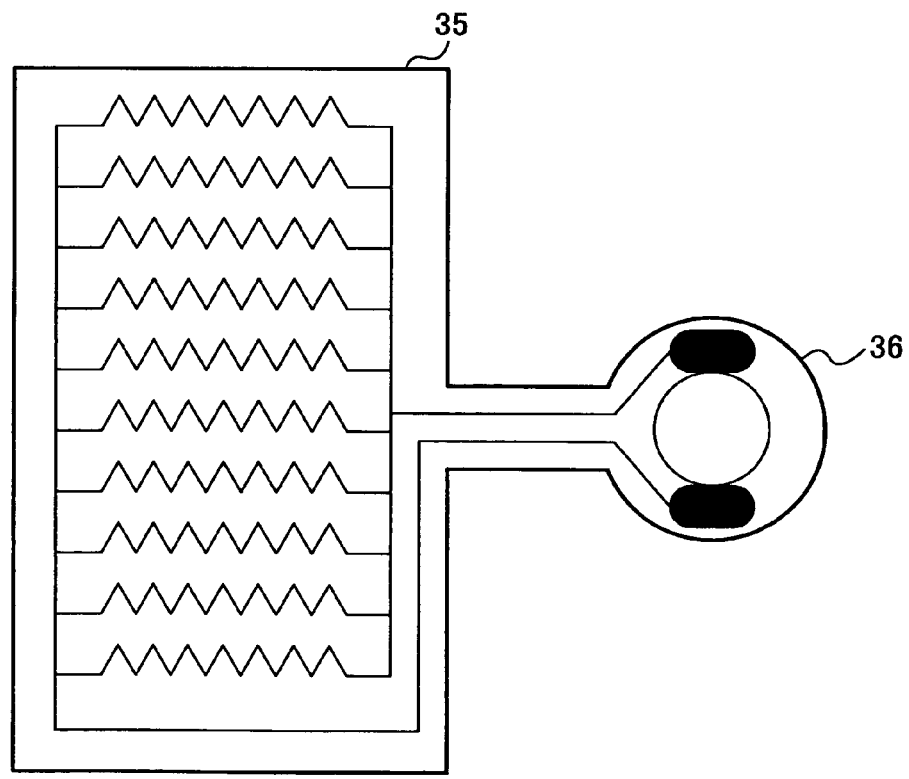
FIG. 10 is a diagram showing the circuit configuration of the sheet connected with the determination unit.

FIG. 10 shows the circuit configuration of the sheet 35.

The sheet 35 is formed of the source material, such as rubber, and the circuit containing two or more resistance elements connected in parallel is provided in the core of the sheet 35.

When the layered composition portion inside the tire 20 is damaged by the unusual deformation of the tire 20, there is the possibility that the disconnection or break of a resistance element in contact with or adjacent to the damaged layered composition portion occurs. The resistance of the whole circuit is increased at the time of the disconnection or break of that resistance element, and the electrical voltage between the terminals of the resistance elements is decreased.

Therefore, the occurrence of a trouble in the layered composition portion of the tire 20 can be determined by monitoring the electrical voltage between the terminals of the resistance elements.

As in the example of FIG. 10, when the ten resistance elements each having the same resistance are connected in parallel, a change of the resistance of the whole circuit by the open circuiting of one resistance element becomes about 10%. A change of the resistance of the circuit of the sheet 35 in this order can be detected sufficiently by monitoring the electrical voltage between the terminals of the resistance elements.

Alternatively, a larger number of resistance elements may be provided in the circuit of the sheet 35 in order to detect the state of the layered composition portion at a larger number of locations of the tire. In such alternative embodiment, two or more sheets 35 each including the circuit which containing about ten resistance elements connected in parallel may be provided.

Figure 11:
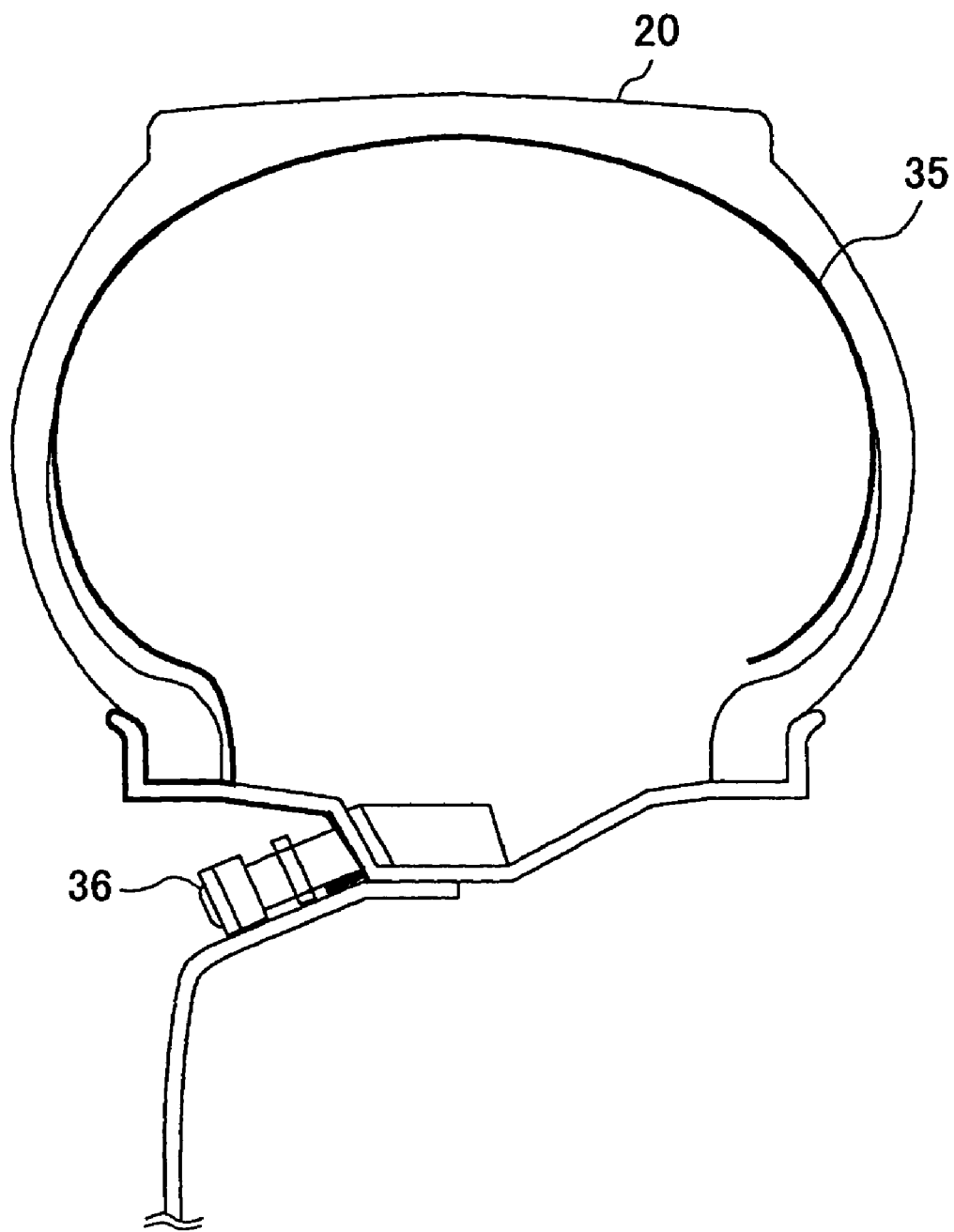
FIG. 11 is a diagram showing a variation of the wired connection of the sheet and the determination unit.

FIG. 11 shows a variation of the wired connection of the sheet 35 and the determination unit 33.

As shown in FIG. 11, the wired connection of the circuit of the sheet 35 and the determination unit 33 may be provided from the outside of the wheel to the tire valve 36 via the tire-bead portion.

Figure 12:
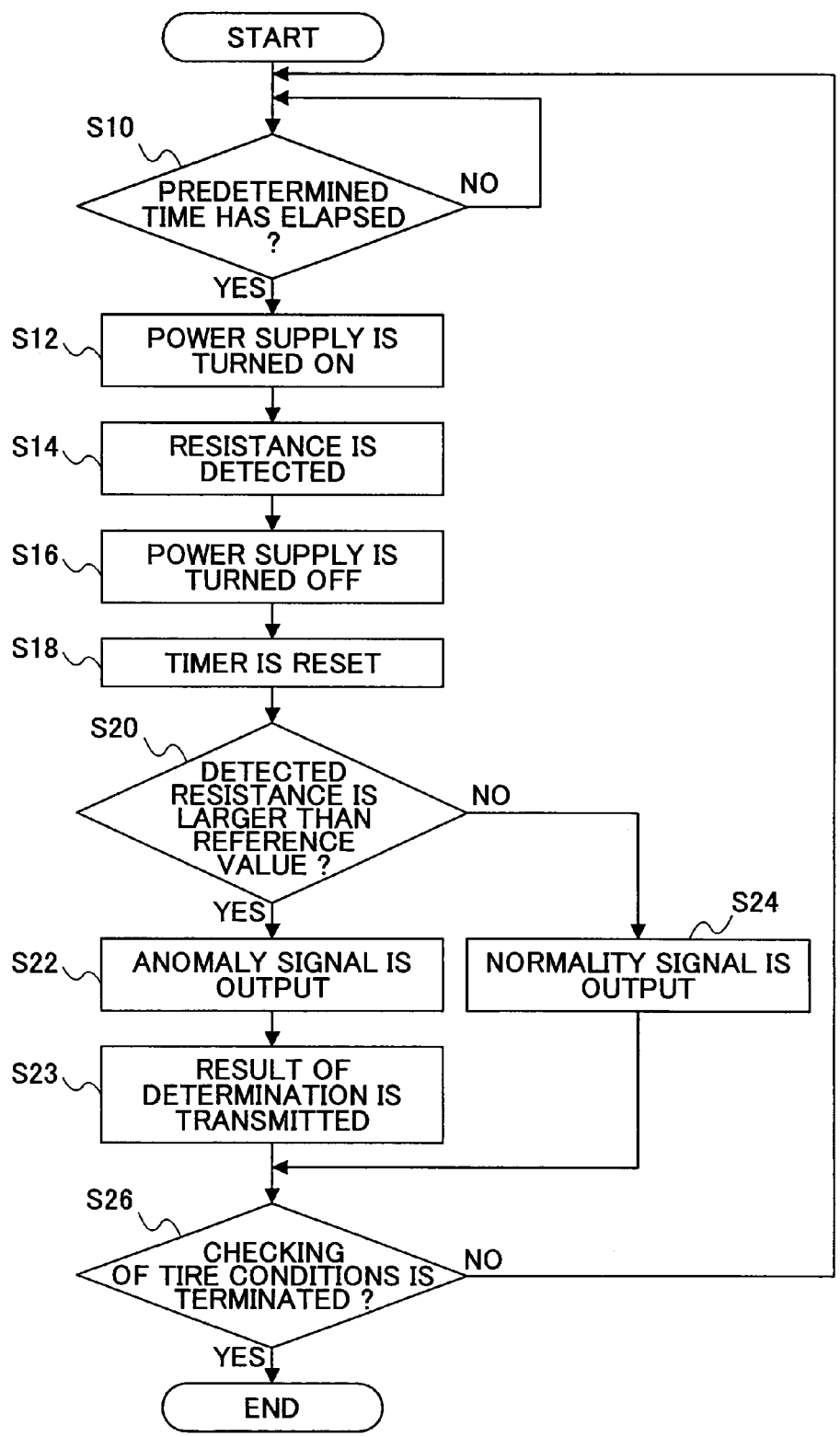
FIG. 12 is a flowchart for explaining the procedure of tire trouble determination performed by the tire trouble detection device in the third preferred embodiment.

FIG. 12 is a flowchart for explaining the procedure of the tire trouble determination performed by the tire trouble detection device in the third preferred embodiment.

In the flowchart of FIG. 12, the determination unit 33 first monitors the timer (which is not illustrated), and is in a waiting state until a predetermined time has elapsed. If the predetermined time has not elapsed (the result at step S10 is NO), the control is transferred to the step S10.

If the timing of the determination comes (the result at step S10 is YES), the determination unit 33 turns ON the supply of electric power to the circuit of the sheet 35 from the power source (which is not illustrated) (S12). The determination unit 33 detects the resistance of the circuit of the sheet 35 from the voltage between the terminals (S14).

After the step S14 is performed, the determination unit 33 turns OFF the supply of electric power to the circuit of the sheet 35 (S16), and the timer is reset to zero (S18).

After the step S18 is performed, the determination unit 33 determines whether the detected resistance is larger than a predetermined reference value (S20).

When the detected resistance is larger than the reference value (the result at step S20 is YES), the determination unit 33 determines that a part of the resistance elements in the sheet 35 is disconnected or broken, and that a trouble occurs in the layered composition portion of the tire. In this case, the determination unit 33 outputs the anomaly signal to the transmitter 40 (S22).

At this time, the tire trouble detection device 30 transmits the result of the determination to the vehicle body 12 through the transmitter 40 (S23). The result of the determination may be transmitted at a predetermined timing but it is desirable to transmit the same to the vehicle body 12 immediately when the occurrence of the trouble is detected.

When the detected resistance is smaller than the reference value (the result at the step S20 is NO), the determination unit 33 determines that any trouble has not occurred in the layered composition portion of the tire. In this case, the determination unit 33 outputs the normality signal to the transmitter 40 (S24).

After the step S23 is performed, the determination unit 33 determines whether the checking of the tire conditions is terminated (S26).

The procedure of FIG. 12 is repeated when the result at the step S26 is negative (NO of S26). In this case, the control is returned to the step S10. The procedure of FIG. 12 is continued until the monitoring of the state of the tire 20 is terminated by the ignition off or the like.

Also the tire trouble determination procedure which is similar to the flowchart of FIG. 12 mentioned above may be carried out by the tire trouble detection device in the first preferred embodiment or the second preferred embodiment. It is possible that each time the predetermined time has elapsed, the tire trouble determination is performed. By performing the procedure in this manner, it is possible to reduce the power consumption.

If a sufficient amount of electric power supplied to the tire trouble detection device can be secured, the supply of electric power to the circuit of the sheet 35 from the power source may be always turned ON so that the monitoring of the state of the tire is always performed.

The result of the determination may be transmitted to the vehicle body 12 at predetermined intervals. Alternatively, the result of the determination may be transmitted to the vehicle body 12 when the unusual result of the determination takes place.

When the result of the determination is transmitted at the predetermined intervals and the unusual result of the determination takes place, it is possible that the usual transmitting intervals is disregarded and the result of the determination indicating the occurrence of the tire trouble is transmitted compulsorily.

Moreover, it is possible that a command of transmitting the result of the determination is sent from the vehicle body 12 to the tire trouble detection device 30, and the tire trouble detection device 30 transmits the result of the determination to the vehicle body 12 in response to the received command.

When the timing of the determination of the tire trouble occurrence differs from the timing of the transmission of the result of the determination, it is possible that the result of the determination obtained after the previous timing of transmission is stored in the memory, and when a next timing of transmission occurs, the result of the determination is read from the memory and transmitted to the vehicle body 12.

Figure 13:
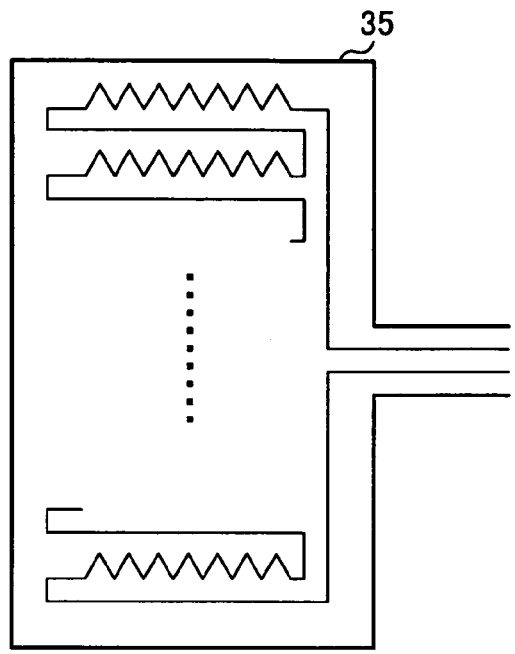
FIG. 13 is a diagram showing a variation of the circuit configuration of the sheet.

FIG. 13 shows a variation of the circuit configuration of the sheet 35. In the example of FIG. 13, the resistance elements provided in the circuit of the sheet 35 are connected in series.

If one of the resistance elements in the circuit of the sheet 35 of the above-mentioned configuration is disconnected or broken, the current will not flow in the circuit of the sheet 35. It is possible to easily detect the occurrence of a trouble in the layered composition portion of the tire.

Figure 14:
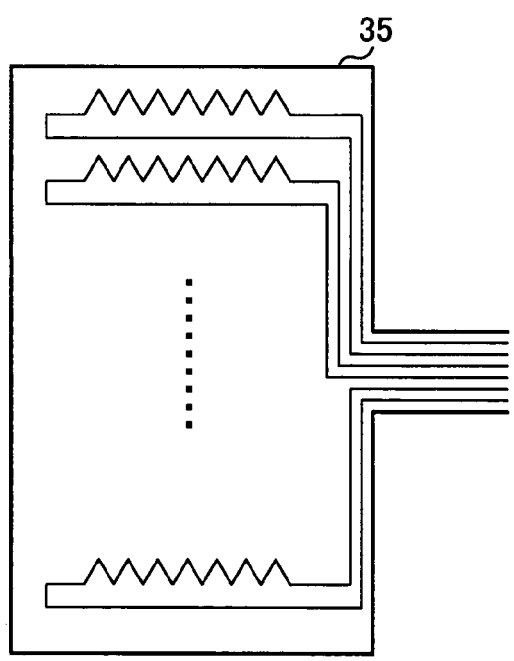
FIG. 14 is a diagram showing another variation of the circuit configuration of the sheet.

FIG. 14 shows another variation of the circuit configuration of the sheet 35. In the example of FIG. 14, the respective resistance elements in the circuit of the sheet 35 are provided independently of each other.

If one of the resistance elements in the circuit of the sheet 35 of the above-mentioned configuration is disconnected or broken, the current will not flow in the circuit containing the defective resistance element. It is possible to easily detect the occurrence of a trouble in the layered composition portion of the tire, and it is also possible to determine the location of the tire where the trouble occurs.

Thus, the arrangement of the resistance elements in the circuit of the sheet 35 may be made in the parallel-connection configuration, the series-connection configuration, or the independent-connection configuration, or in any combination of these configurations.

The sheet 35 may be formed of a conductive rubber, a pressure conductive rubber or the like. Moreover, it is possible to arrange a plurality of conductive-rubber sheets independently, in order to determine the location of the tire where a trouble occurs.

The rubber which covers the carcass may be formed of a conductive rubber. In such embodiment, when the carcass is damaged, the conductive rubber is broken. By utilizing this feature, it is possible to detect the occurrence of damage on the carcass by monitoring the state of the conducting rubber to which the electric power is supplied.

Alternatively, it is possible to detect the expansion/contraction state of the layered composition portion inside the tire by using the resistance element the resistance of which varies by the expansion/contraction condition of the resistance element.

In a variation of the present, it is possible to estimate the temperature of the tire from the detected resistance of the resistance element by utilizing the resistance vs. temperature characteristics of the resistance element. In such embodiment, it is necessary to correct the estimated temperature by taking into consideration the rise of temperature at the time of normal running of the vehicle. Usually, the temperature rise at the time of the normal running of the vehicle is determined in view of the load of the vehicle, the running time of the vehicle, etc.

In a variation of the present embodiment, it is possible to estimate the temperature of the local portion of the tire by arranging the resistance elements independently. The damaging of the tire can be prevented in advance by estimating the temperature of the tire.

Next, a description will be given of the fourth preferred embodiment of the invention.

Similar to the third preferred embodiment, in the fourth preferred embodiment, the resistance elements or the conductive elements are arranged in contact with or adjacent to the layered composition portion inside the tire, a change of continuity of the layered composition portion inside the tire is detected by detecting a change of the resistance, the current value, etc., so that the occurrence of a trouble in the layered composition portion of the tire is determined.

In the present embodiment, the arrangement of the conductor elements is devised and the technique of determining a specific location of the tire where a trouble occurs is proposed.

In many cases, it is difficult to visually check the damaged position of the layered composition portion of the tire from the exterior. According to the present embodiment, the damage position can be determined. Even a driver who does not have the special knowledge can understand the degree of danger of the trouble in the tire and can take suitable countermeasures of repair, exchange, etc, for the tire trouble.

The composition of the vehicle 10 in which the tire trouble detection device of this embodiment is provided is essentially the same as that of the vehicle 10 shown in FIG. 1. A description will be given of only the differences between the fourth preferred embodiment and the first to third preferred embodiments.

Figure 15A:
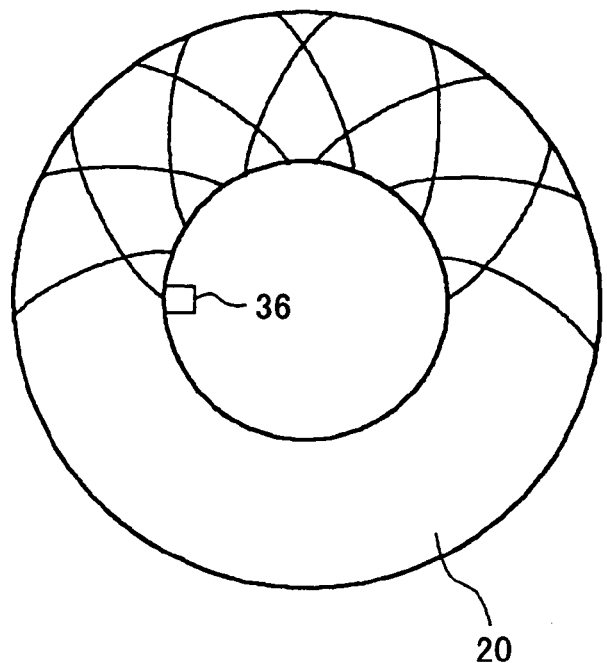
FIG. 15A and FIG. 15B are diagrams showing the conductor elements arranged in a lattice formation in the layered composition portion inside the tire.
Figure 15B:
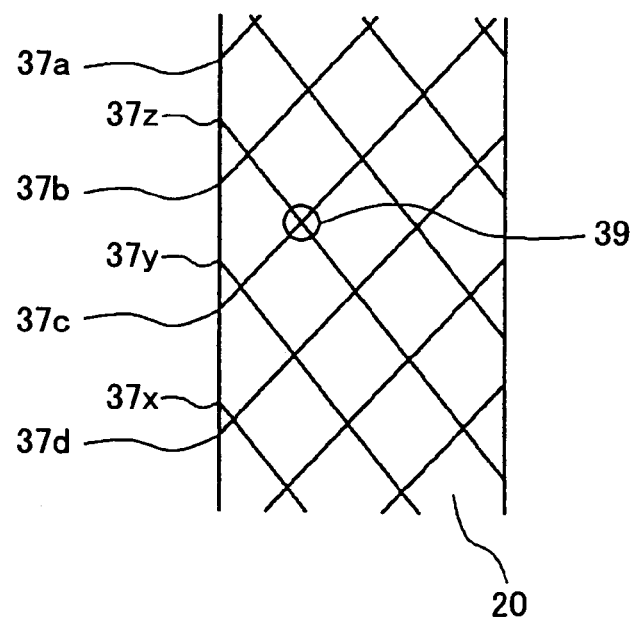

FIG. 15A and FIG. 15B show the conductor elements 37 arranged in a lattice formation in the layered composition portion inside the tire 20.

The conductor elements 37 may be provided on the surface of the layered composition portion inside the tire 20, or may be provided in the core of the tire 20.

FIG. 15A shows the side surface inside the tire 20, and FIG. 15B shows the front surface inside the tire 20.

Each conductor element 37 is insulated independently, so that it is not in electrical contact with other conductor elements 37. The current which flows each conductor element 37 can be observed individually.

The determination unit 33 which is provided in the tire valve 36 or the like turns ON the supply of electric current to the respective conductor elements 37 from the power source (not illustrated), and measures the voltage between the terminals at the ends of each conductor element 37.

In order to facilitate the measurement of the voltage, it is possible that the terminals at the ends of all the conductor elements 37 are wired to the location where the determination unit 33 is provided. For example, all the terminals may be wired to the tire valve 36. If any of the conductor elements 37 are damaged or fractured due to the unusual deformation of the tire 20, the voltage between the terminals of such damaged conductor element 37 changes. Hence, the occurrence of a trouble in the tire can be detected by utilizing this feature.

The determination unit 33 determines the position where a trouble occurs in the tire based on a combination of the conductor elements 37 at which the trouble is monitored.

For example, when the trouble is monitored at the conductor elements 37c and 37z as shown in FIG. 15B, it is estimated that the conductor elements 37c and 37z are damaged or fractured near the position 39 that is the intersection of the conductor elements 37c and 37z. Thus, it is estimated that the trouble occurs also in the layered composition portion of the tire 20 near the position 39.

Accordingly, by arranging the plurality of conductor elements 37 in a lattice formation, the occurrence position where the trouble occurs in the tire can be determined easily and correctly, and it is possible to take suitable countermeasures according to the occurrence position of the trouble.

Similar to the first to third preferred embodiments mentioned above, the result of the determination by the determination unit 33 may be transmitted to the vehicle body 12 from the transmitter 40 at a predetermined timing.

Moreover, the determination unit 33 may transmit only the measurement results of the voltages between the terminals of the conductor elements 37 to the vehicle body 12, and ECU 64 may determine the occurrence position of the trouble.

ECU 64 may determine the classification of warning according to the position where the trouble occurs in the tire. For example, the trouble can be fixed in many cases when the trouble occurs in the tread portion of the tire 20. In this case, ECU 64 may give to the driver the indication that the trouble occurs in the tread portion of the tire 20, and turn ON the warning lamp 72 or the like in order to provide the warning indication that repair is recommended to be carried out.

At this time, ECU 64 may display the occurrence position of the trouble in the tire (i.e., the position which requires repair) with the indicator device (not illustrated).

Moreover, the trouble cannot be fixed and exchange of the tire 20 is required in many cases when the trouble occurs in the sidewall portion of the tire 20. In this case, ECU 64 may give to the driver the indication that the trouble occurs in the sidewall portion of the tire 20, and turn ON the warning lamp 72 or the like in order to provide the warning indication that exchange of the tire 20 is recommended to be carried out.

When the damage in the sidewall portion of the tire occurs, ECU 64 may give to the driver the noticeable warning indication. For example, it is possible that, when the damage in the tread portion occurs, the warning lamp 72 is blinked, and when the damage in the sidewall portion occurs, the warning lamp 72 is turned ON and the buzzer 70 be sounded in order to call attention of the driver to the occurrence of the damage. At this time, ECU 64 may further perform control of decreasing the vehicle speed for increased safety of the vehicle.

When ECU 64 determines the classification of warning, it is desirable to make the determination based on the presence of the belt. For example, when the trouble occurs in the position with the belt presented, it is determined that repair is possible, and the warning indication that repair is recommended to be carried out may be outputted. And, when the trouble occurs in the position without the belt presented, it is determined that repair is impossible, and the warning indication that exchange of the tire is recommended to be carried out may be outputted.

The determination unit 33 may be configured to accumulate the measurement results or the result of the determination in the internal memory, so that the accumulated information can be read from the internal memory using the diagnostic tool or the like.

Furthermore, in another example, it is possible that the determination unit 33 and the transmitter 40 are not arranged in the tire 20, and the tire trouble detection device is configured so that the direct observation of continuity of the conductor elements 37 is carried out from the outside by using the tester or the like. In this case, in order to facilitate the observation, the tire trouble detection device may be configured to further include a collection unit which collects the terminals of the conductor elements 37. For example, the coupler may be used as an example of the collection unit so that the coupler can collect, at the tire valve 36, the terminals of the conductor elements 37. In such embodiment, the tester which observes the continuity of the conductor elements 37 in the tire may be reserved in the dealer, the gas station, etc., or may be sold to the driver. Hence, with simple composition, it is possible to detect the occurrence of a trouble in the tire 20 and the occurrence position of a trouble in the tire 20.

Figure 16A:
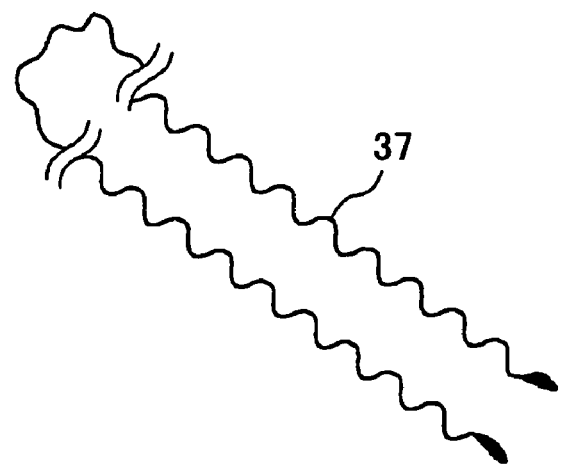
FIG. 16A and FIG. 16B are diagrams showing the composition of the conductor elements.
Figure 16B:
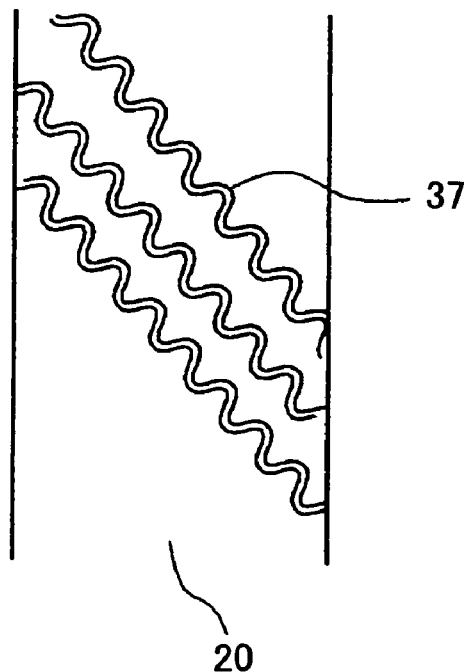

FIG. 16A and FIG. 16B show an example of the composition of the conductor elements 37. As shown in FIG. 16A, the conductor elements 37 may have a wave-like configuration.

In this embodiment, the larger area can be covered with the conductor elements 37, and the occurrence of a trouble in the layered composition portion of the tire 20 can be detected exactly. Moreover, appropriate elasticity can be given to the conductor elements 37 by arranging them in a wave-like configuration. It is desirable that the conductor elements 37 have some elasticity such that they are not damaged with a deformation that does not cause the layered composition portion of the tire 20 to have a trouble, but they are damaged or fractured certainly with a deformation that does cause a trouble to occur in the layered composition portion of the tire 20. When the conductor elements 37 have appropriate elasticity by themselves, it is possible to arrange the conductor elements 37 in the form of a straight line.

In FIG. 15A and FIG. 15B, each conductor element 37 is indicated by a single line for the purpose of simplicity of illustration. Alternatively, each of the conductor elements 37 may be configured to have a wave-like configuration as shown in FIG. 16B.

Moreover, as mentioned above, in order to collect the terminals at the ends of the conductor elements 37 at one position, the conductor elements 37 may be configured to extend across the tire 20 as shown in FIG. 16B.

The conductor element 37 may be arranged on a flexible wiring board or the like. The flexible wiring board on which the conductor elements 37 are arranged may be embedded in the layered composition portion of the tire 20, for example, in the carcass. By this embodiment, the arrangement or wiring of the conductor elements 37 can be made easy, and the manufacturing cost can be reduced.

Figure 17A:
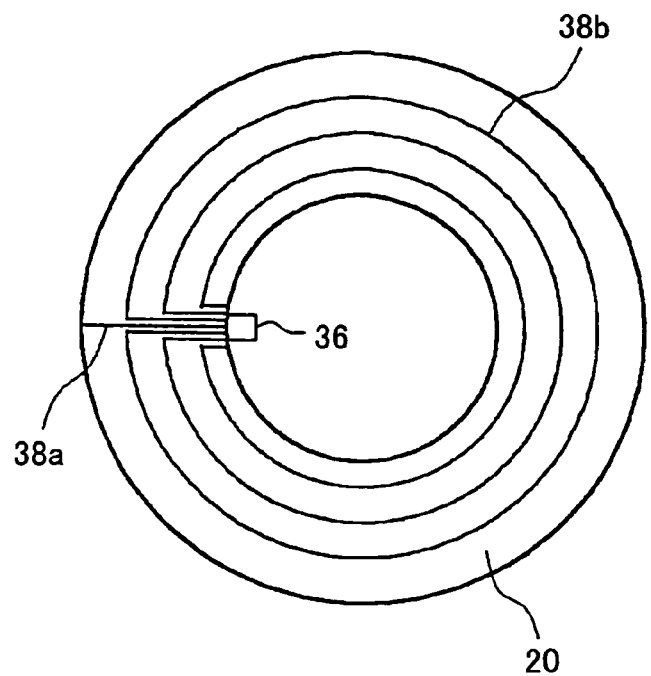
FIG. 17A and FIG. 17B are diagrams showing the composition of the conductor elements arranged in an annular formation in the layered composition portion inside the tire.
Figure 17B:
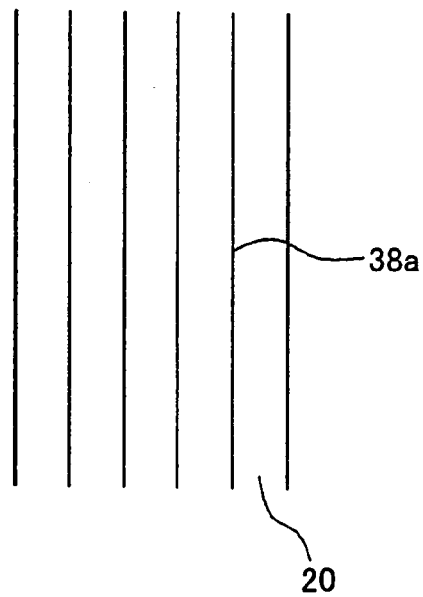

FIG. 17A and FIG. 17B show an example of the composition of the conductor elements 38a and 38b arranged in an annular formation in the layered composition portion inside the tire 20.

In the example of FIG. 17A, it can be determined whether the occurrence position of a trouble is the tread portion of the tire or the sidewall portion of the tire, by detecting whether the trouble occurs in the conductor element 38a arranged in the tread portion or the conductor element 38b arranged in the sidewall portion.

By this embodiment, it is possible that appropriate warning indication can be outputted depending on whether the occurrence position of a trouble is the tread portion of the tire or the sidewall portion of the tire. Namely, in the former case, the trouble can be fixed, and in the latter case exchange of the tire is required.

Figure 18A:
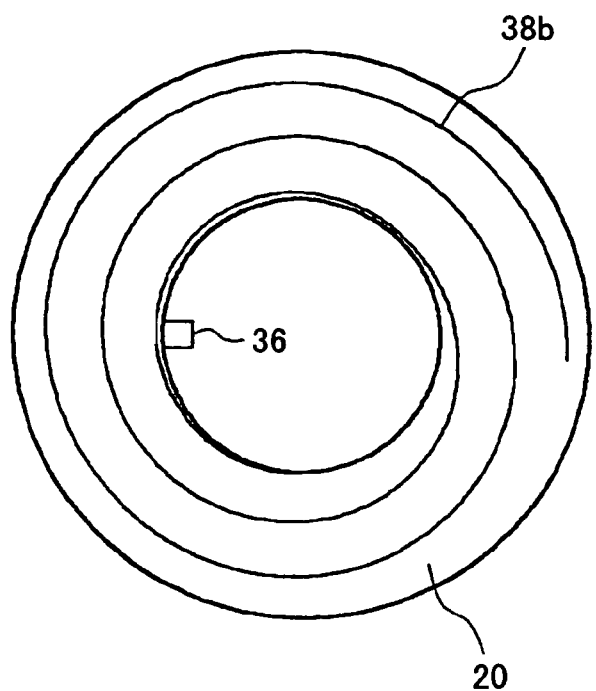
FIG. 18A and FIG. 18B are diagrams showing the composition of the conductor elements arranged in an annular formation in the sidewall portion and arranged in a lattice formation in the tread portion.
Figure 18B:
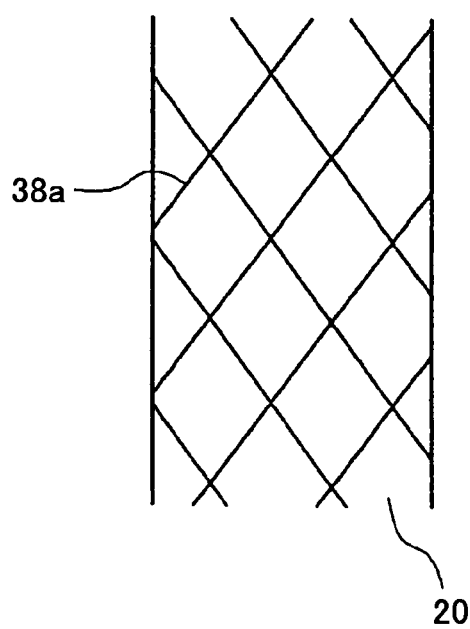

FIG. 18A and FIG. 18B show an example of the composition of the conductor elements 38a and 38b arranged in an annular formation in the sidewall portion and in a lattice formation in the tread portion.

In the example of FIG. 18A, it can be determined whether the occurrence position of a trouble is the tread portion of the tire or the sidewall portion of the tire, by detecting whether the trouble occurs in the conductor elements 38a arranged in the tread portion or in the conductor element 38b arranged in the sidewall portion.

Moreover, when the trouble occurs in the tread portion, the occurrence position of the trouble can be determined based on a combination of anomaly results in the conductor elements 38a where the occurrence of the trouble is detected.

FIG. 19 is a flowchart for explaining the procedure of the tire trouble determination performed by the tire trouble detection device in the fourth preferred embodiment.

In the procedure of FIG. 19, the determination unit 33 supplies the current to each conductor element 37, and monitors the continuity of the conductor elements 37 (S50). The determination unit 33 determines whether an anomaly in the continuity of the conductor elements 37 occurs (S52).

When the anomaly does not occur (NO of S52), the control is transferred to the step S50 so that the testing of the continuity is again performed at the next timing.

When the anomaly in the continuity at any of the conductor elements 37 occurs (YES of S52), the determination unit 33 determines the occurrence position of the trouble in the tire based on the identification of the defective conductor element 37 where the occurrence of the trouble is detected (S54).

The result of the determination by the determination unit 33 is transmitted to ECU 64 of the vehicle body by using the transmitter 40, and ECU 64 outputs a warning indication according to the occurrence position of the trouble.

The present invention is not limited to the above-described embodiments, and variations and modifications may be made without departing from the scope of the present invention.

Concerning the detecting elements, such as the electrodes, the strain gage, the sheet and the conductor elements in the above-described embodiments, it is desirable to design the quality of the material, the thickness and the strength, so that the original performance may not be degraded when installed on the tire.

In the above-described embodiments, the occurrence of a trouble in the layered composition portion inside the tire is determined by the results of the detection by the detection unit. However, the standing-wave phenomenon, the air failure of the tire, etc. are also detectable from the detection results. For example, the strain gages in the second preferred embodiment, the resistance elements in the third preferred embodiment, or the conductor elements in the fourth preferred embodiment may be provided at two or more positions inside the tire, and from the periodicity of changes, such as the strain-gage output, the resistance and the current value, during rotation of the tire, the condition of the deformation of the tire can be grasped so that the occurrence of the standing-wave phenomenon can be detected.

Moreover, in an alternative embodiment, by making use of the fact that the amount of bending of the part of the tire in contact with the road surface is affected by the pneumatic pressure of the tire, it is possible to detect the pneumatic pressure of the tire from changes of the strain-gage output, the resistance, the current value, etc, during rotation of the tire.

In the above-described embodiments, the determination unit 33 is provided in the tire 20. However, in an alternative embodiment, it may be provided in the vehicle body 12. In such alternative embodiment, the state quantities detected by the detecting elements, such as the electrodes, the strain gages, the resistance elements and the conductor elements, may be transmitted to the vehicle body 12 through the transmitter 40, so that the determination unit 33 on the side of the vehicle body 12 can acquire the state quantities and determine the state of the tire 20.

What is claimed is:

1. A tire trouble detection device which detects occurrence of a trouble in a tire, comprising:

a detection unit detecting a deformation of a layered composition portion of a sidewall portion of the tire, the layered composition portion being arranged in layers inside an outer sheath forming an outside surface of the tire, and forming a frame of the tire, and a determination unit receiving a result of the detection from the detection unit and determining occurrence of a trouble of the layered composition portion based on the received result of the detection.

2. The tire trouble detection device according to claim 1 wherein the detection unit is configured to detect an amount of deformation of a sidewall portion of the tire, and the determination unit is configured to determine the occurrence of a trouble of the layered composition portion when the detected amount of deformation of the sidewall portion exceeds a predetermined value.

3. The tire trouble detection device according to claim 2 wherein the detection unit comprises detecting elements which are provided in contact with or adjacent to the layered composition portion to detect electrically the amount of deformation of the sidewall portion.

4. The tire trouble detection device according to claim 3 wherein the detecting elements are a plurality of electrodes arranged in a radial direction of the tire at the sidewall portion in an air cell of the tire, and the determination unit is configured to determine the occurrence of a trouble of the layered composition portion based on a change of a current between the plurality of electrodes.

5. The tire trouble detection device according to claim 1 wherein the detection unit is configured to detect a change of continuity of the layered composition portion, and the determination unit is configured to determine the occurrence of a trouble of the layered composition portion based on the change of continuity of the layered composition portion.

6. The tire trouble detection device according to claim 5 wherein the detection unit comprises a detecting element which is provided in contact with or adjacent to the layered composition portion to detect electrically the change of continuity of the layered composition portion.

7. The tire trouble detection device according to claim 6 wherein the detecting element is a resistance element, and the determination unit is configured to determine the occurrence of a trouble of the layered composition portion based on a change of a resistance of the resistance element.

8. The tire trouble detection device according to claim 6 wherein the detection unit comprises a plurality of detecting elements each provided in contact with or adjacent to the layered composition portion to detect electrically a change of continuity of the layered composition portion, and the determination unit is configured to receive results of the detection from the plurality of detecting elements and to determine an occurrence position of a trouble of the layered composition portion based on a combination of anomaly results of the detection among the received results of the detection from the plurality of detecting elements.

9. The tire trouble detection device according to claim 6 wherein the detection unit comprises a plurality of detecting elements arranged at a tread portion and a sidewall portion of the layered composition portion to detect electrically a change of continuity of the layered composition portion, and the determination unit is configured to receive results of the detection from the respective detecting elements of the tread portion and the sidewall portion and to determine whether an occurrence position of a trouble of the layered composition portion is the tread portion or the sidewall portion, based on the received results of the detection.

10. The tire trouble detection device according to claim 6 wherein the detecting element is provided with an elasticity such that the detecting element outputs an anomaly result of detection when subjected to a deformation that causes a trouble in the layered composition portion, and outputs a normality result of detection when subjected to a deformation that does not cause a trouble in the layered composition portion.

11. The tire trouble detection device according to claim 6 wherein the detecting element has a wave-like configuration.

12. The tire trouble detection device according to claim 8 further comprising a warning unit which outputs a warning when it is determined that a trouble occurs in the layered composition portion, and the warning unit is configured to change the contents of the warning according to the occurrence position of the trouble determined by the determination unit.

13. The tire trouble detection device according to claim 1 wherein the detection unit is configured to detect a force acting in a direction parallel to a surface of the layered composition portion, and the determination unit is configured to determine the occurrence of a trouble in the layered composition portion when the detected force exceeds a predetermined value.

14. A tire for use with a tire trouble detection device, comprising:

a layered composition portion which is arranged in layers inside an outer sheath forming an outside surface of the tire, and forms a frame of the tire; and a plurality of detection units which are arranged in a lattice formation in contact with or adjacent to the layered composition portion to detect electrically a change of continuity of the layered composition portion.

15. The tire according to claim 14 wherein the plurality of detection units are a plurality of conductor elements, and the tire further comprises a collection unit collecting terminals of the plurality of conductor elements.

* * * * *